INVENTOR.
HENRY E. BECK

Jan. 20, 1959  H. E. BECK  2,869,665
STEERING MECHANISM
Filed Aug. 19, 1955  5 Sheets-Sheet 2

INVENTOR.
HENRY E. BECK
BY James E. Nilles
ATTORNEY.

INVENTOR.
HENRY E. BECK
BY James E. Nilles
ATTORNEY.

Jan. 20, 1959      H. E. BECK      2,869,665
STEERING MECHANISM
Filed Aug. 19, 1955      5 Sheets-Sheet 4

INVENTOR.
HENRY E. BECK
BY *James E. Nilles*
ATTORNEY.

Jan. 20, 1959 — H. E. BECK — 2,869,665
STEERING MECHANISM
Filed Aug. 19, 1955 — 5 Sheets-Sheet 5
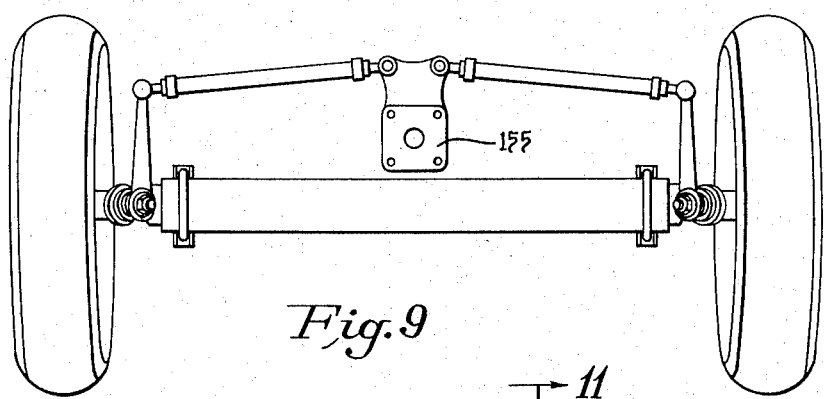
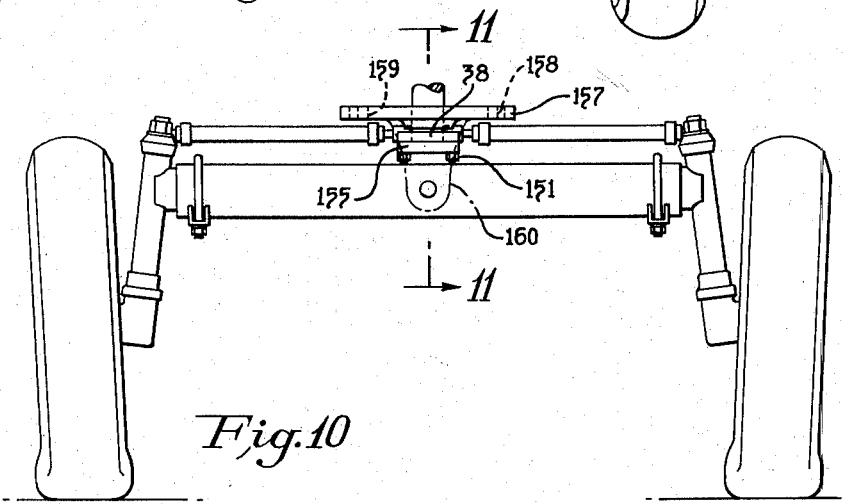
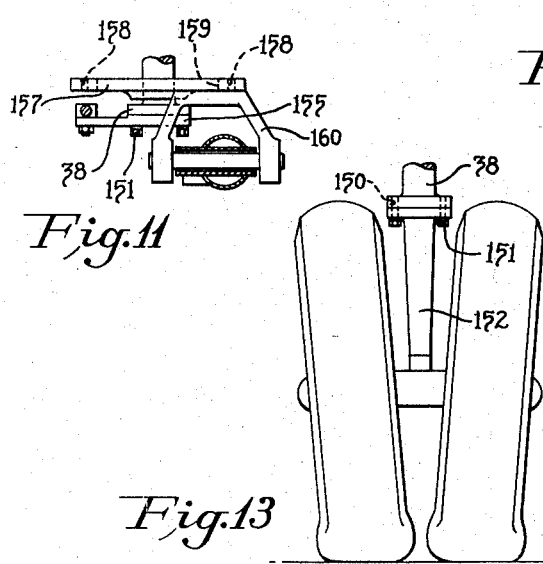
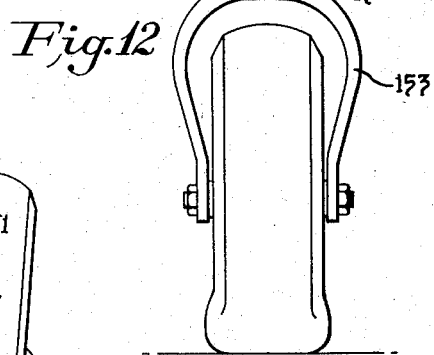
INVENTOR.
HENRY E. BECK
BY James E. Nilles
ATTORNEY.

United States Patent Office 2,869,665
Patented Jan. 20, 1959

2,869,665

STEERING MECHANISM

Henry E. Beck, Racine, Wis., assignor to Massey-Ferguson Inc., a corporation of Maryland Application August 19, 1955, Serial No. 529,398

2 Claims. (Cl. 180—79.2)

This invention relates to hydraulic steering gear which finds particular utility in farm tractors.

It is a general object of this invention to provide a hydraulic steering mechanism which is highly compact and adapted to fit into an existing tractor design at an economical cost.

It is another object of this invention to provide a tractor steering mechanism which is formed as an integral unit within a single housing; which permits either power steering or conventional manual steering by utilizing a maximum number of common parts and in which the interchange from one type to the other is easily and economically made. The dimensions, shape and arrangement of the hydraulic steering gear are the same as the standard manually operated steering gear so that cost of fabrication and assembly of my novel hydraulic steering gear is held to a practical amount.

It is another object of this invention to provide a highly compact power steering unit which is located on the tractor so as to be fully enclosed and protected and highly efficient in operation. At the same time the unit is adapted to be utilized with various types of front wheel suspension systems, such interchange being easily and quickly accomplished.

Other objects and advantages of this invention will become more apparent from the following detailed description and attached sheets of drawings wherein a form of the invention is illustrated.

Figure 9 is a plan view of one type of front wheel suspension systems which can be utilized with this invention.

Figure 10 is a front elevational view of the suspension system, or wheel assembly, shown in Figure 9.

Figure 11 is a fragmentary side elevational view, partly in section, taken on line 11—11 of Figure 10.

Figures 12 and 13 are views of other types of wheel suspensions which can be utilized with this invention.

Figure 1:
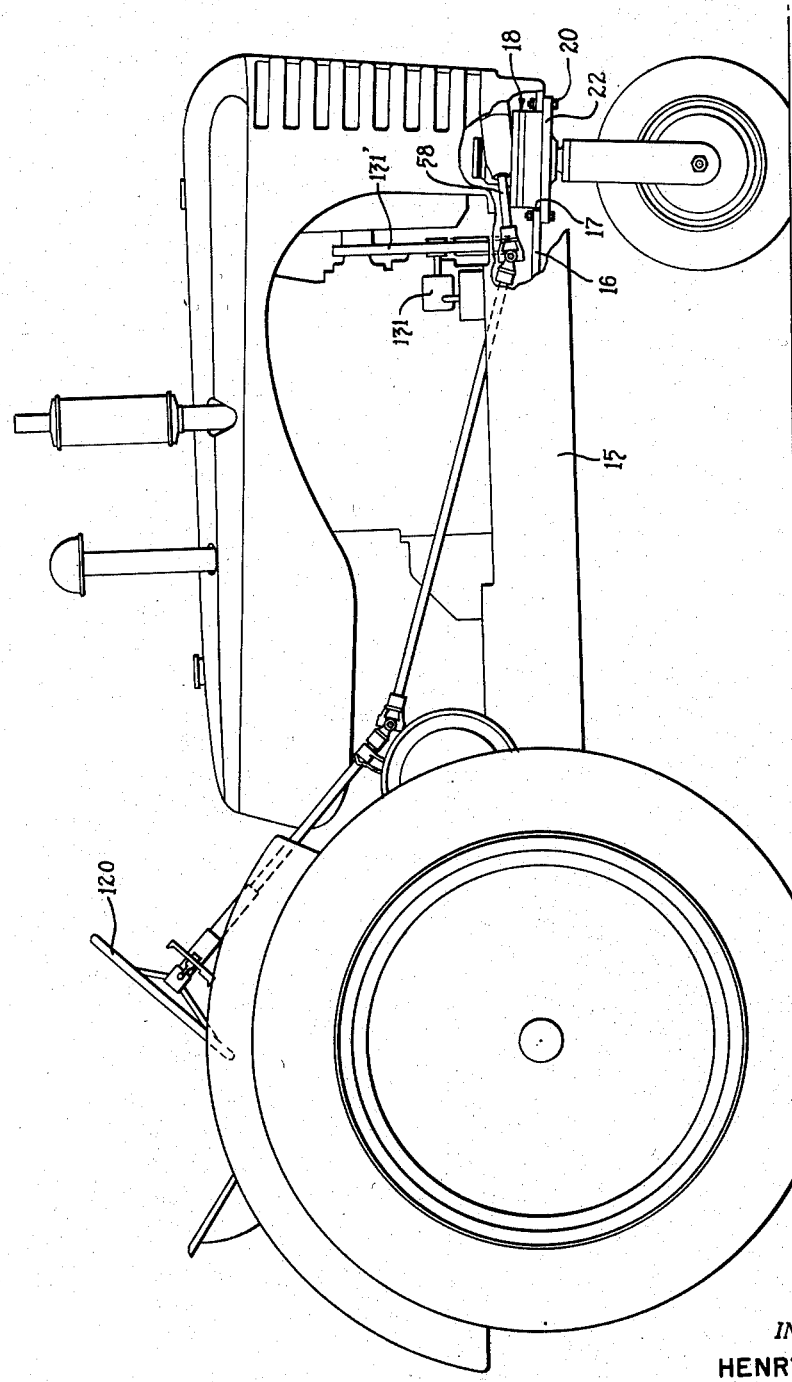
Figure 1 is an elevational view of a tractor showing the invention as applied thereto, certain parts being broken away for the sake of clarity.
Figure 2:
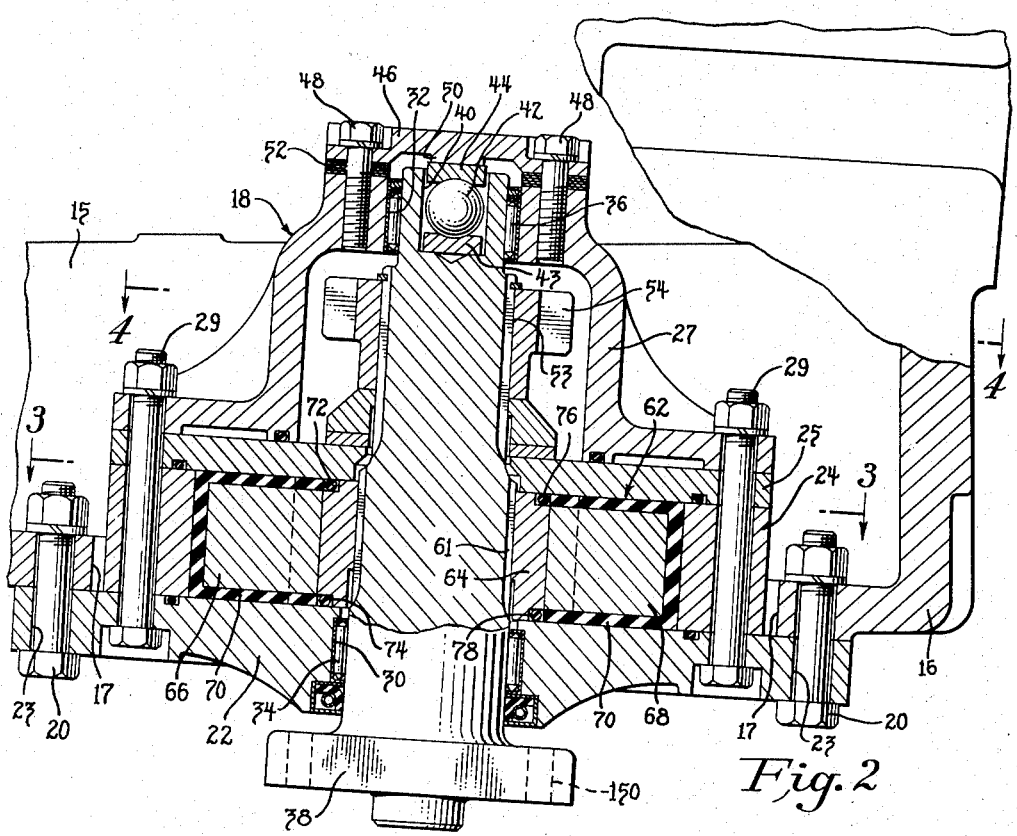
Figure 2 is an elevational, cross-sectional view of the steering gear assembly, on an enlarged scale, with certain parts broken away and others removed for the sake of clarity in the drawings.

Referring more particularly to Figure 1 of the drawings, the main tractor frame 15 has a horizontally disposed central portion 16 having a large opening 17 at the forward end thereof. The steering gear assembly, shown generally as 18 is inserted in opening 17 and secured to the central portion 16 of the frame by means of nuts and bolts 20. As best shown in Figure 2, the steering gear assembly comprises a lower circular plate member 22 having a series of circumferentially spaced apertures 23 through which bolts 20 extend. A circular vane body 24, plate 25 and a steering pinion housing 27 are secured to the plate 22 by means of a series of circumferentially spaced nuts and bolts 29. Thus a unitary housing is formed from members 22, 24, 25 and 27.

The plate 22 has an opening 30 and the housing 27 has an opening 32 in which is rotatably mounted by means of needle bearings 34, 36 respectively, the steering spindle 38. In this manner the vertically positioned spindle 38 is mounted within the housing at two bearing locations which are spaced a considerable distance apart in the vertical direction. The upper end of steering spindle 38 has an axially aligned bore 40 extending downwardly from the top and in which is mounted the thrust bearing 42 between the hardened bearing plates 43, 44. A cap plate 46 is secured by the cap bolts 48 to the housing 27. A downwardly extending boss 50 of the cap plate 46 is adapted to bear against the bearing plate 44. Shims 52 are provided between the cap plate 46 and housing 27 so as to be able to take up any end-play in the steering spindle 38. It will be noted that the needle bearings 34 and 36 are spaced a relatively wide distance apart in the vertical direction so as to afford good support of the spindle against any bending or twisting to which it is constantly subject. These two spaced support bearings are located within the housing and yet are relatively close to the ground thereby minimizing the moment arm through which the ground reaction is transmitted. As will appear more fully hereinafter, interchangeable front end suspensions of various types may be used without requiring additional bearing support near the axis of the ground wheel. By utilizing the thrust bearing 42 which is recessed within the spindle 38, a considerable saving of space, in the vertical direction, is accomplished. Furthermore, by absorbing a major portion of the thrust by means of this ball bearing arrangement, relatively inexpensive needle bearing 34, 36 can be utilized at 30, 32.

Figure 4:
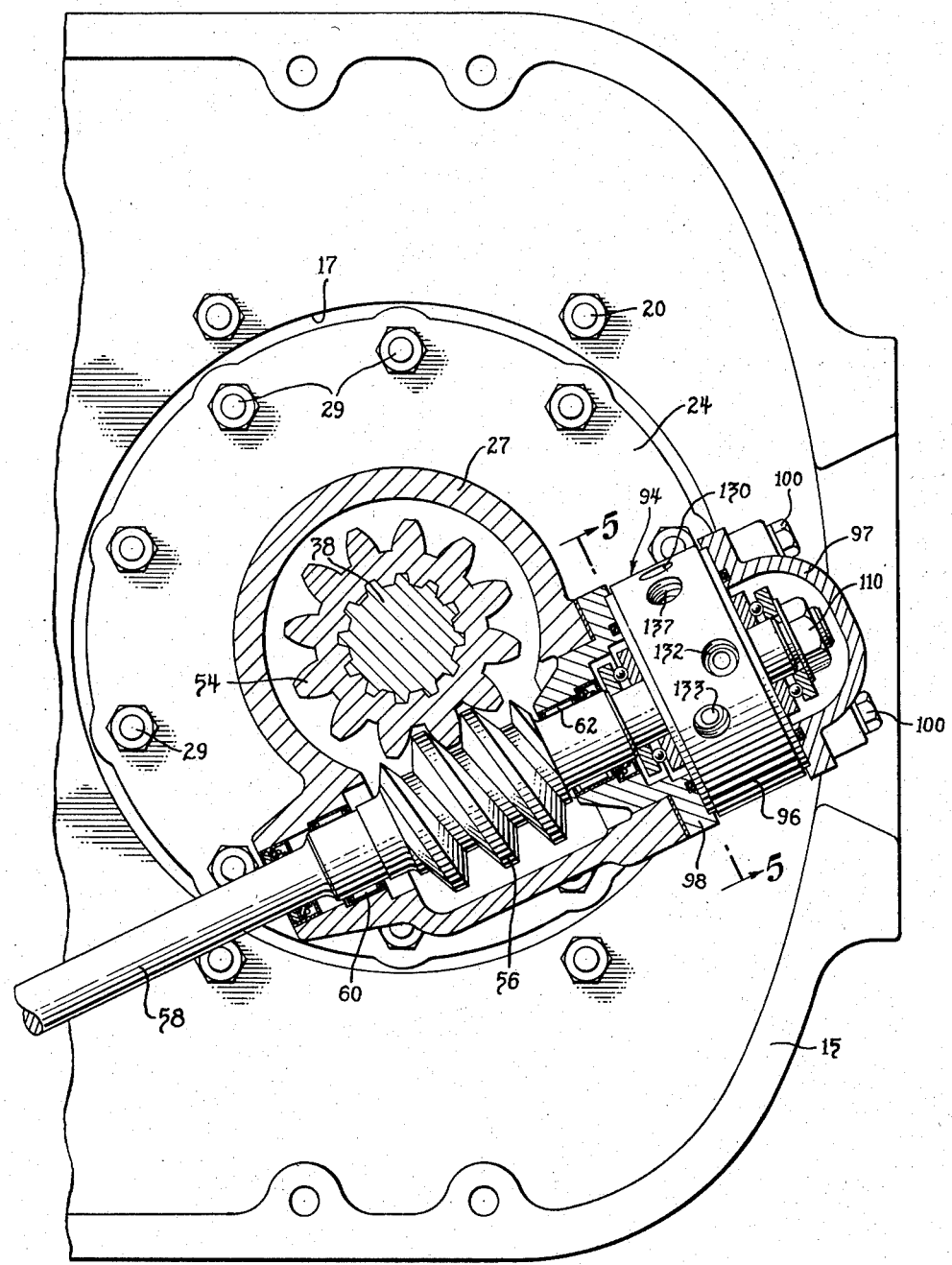
Figure 4 is a horizontal sectional view taken on line 4—4 of Figure 2.

Splined to upper portion 53 of the spindle is a steering pinion 54 which is adapted to mesh with the worm 56 (Fig. 4) on the steering shaft 58. Shaft 58 is rotatably mounted in the housing 27 in needle bearing assemblies 60, 62.

Again referring to Figure 2, splined to intermediate portion 61 of spindle 38, and between the plates 22 and 25, is the rotary piston or double vane assembly 62 comprised of a collar 64 which has diametrically opposed and radially extending vanes 66, 68. These vanes have a groove on their upper, lower and outer edges into which is seated the packing 70 which forms an efficient seal between the vanes and the internal wall of vane body member 24, plate 22 and plate 25. O-rings 72, 74 are inserted in grooves 76, 78 respectively, which extend around the upper and lower surfaces of the collar 64. By means of these O-rings, a seal is provided between the collar 64 and the plate members 22, 25 to prevent escape of fluid out of the chambers now to be described. The surfaces of plate 22, vane body 24 and plate 25 which mate together are flat with no shoulders or projections. Machining of these parts is therefore a relatively simple matter. The height of member 24 can be held very closely by a simple straight grinding operation.

Figure 3:
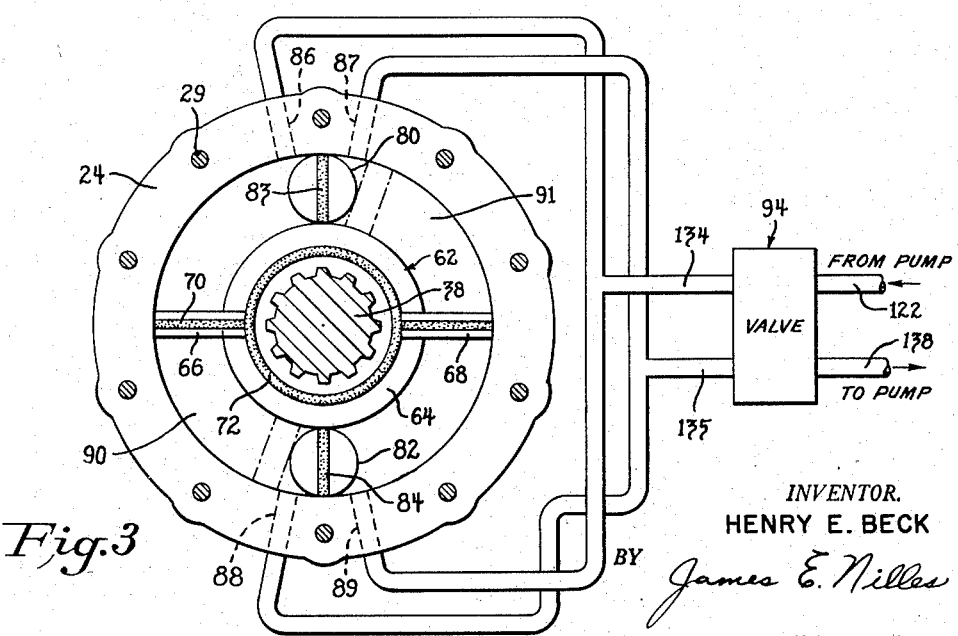
Figure 3 is a plan view in section taken on line 3—3 of Figure 2 and with the valve and flow lines shown diagrammatically.

Referring to Figure 3, stationary circular vane members 80, 82 are secured between plate 22, 25 on diametrically opposite sides of the steering spindle 38. These stationary vanes are also provided with packing 83, 84 respectively, which forms a seal between the stationary vanes, plates 22, 25 and vane assembly 62, and main body 24. Thus two separate double-acting hydraulic motor cylinders 90, 91 are formed on diametrically opposite sides of spindle 38.

As best shown in Figure 3, ports 86, 87 are provided in vane body 24 on either side of stationary vane 80. Similarly, ports 88, 89 are provided through the vane body 24 at either side of stationary vane 82. The cylinders 90, 91 which are formed between the plates 22, 25, stationary vanes 80, 82 and vane body 24 are thus in fluid communication with the valve 94. The vanes 66 and 68 divide their respective cylinders into two working chambers.

The details of the valve 94 are shown in Figures 5 to 8 and this valve comprises a central valve body portion 96 secured between end portions 97, 98 which in turn are rigidly secured to pinion housing 27 by means of the long cap screws 100 which extend through apertures 101 in valve body 96 and are threadably engaged into pinion housing 27. Steering shaft 58 has a reduced portion 102 at its forward end which extends into the valve body 96 and has mounted thereon a spool valve 104, the length of which is coextensive with the width of valve body 96. A ball bearing assembly, comprising an inner race 105 and outer race 106 and balls 107, is mounted on the reduced portion 102 between the shoulder 108 of the shaft 58 and the spool valve 104. A similar bearing assembly is mounted on the reduced portion 102 between the other side of the spool valve and a securing nut 110 which is threadably engaged on the end of shaft portion 102. This bearing assembly comprises an inner race, or plate 112, an outer race 113 and the intermediate balls 114. The shaft 58, spool valve 104 and bearing assemblies on either side of the valve are rigidly secured together by nut 110 and move together as a single unit relative to the valve body 96. A counter bore 116 is provided in the valve body 96 which is on the order of a few thousandths of an inch deep. The outer race 105 is adapted to slide in and out of this counterbore or recess upon axial movement of the steering shaft 58. A similar counterbore or recess 118 is provided on the opposite side of the valve body 96 and the inner race 112 is adapted to slide in and out of this recess upon axial movement of the shaft 58. Such axial movement of shaft 58, which is caused by turning steering wheel 120, opens or closes the various ports of the valve body 96, by movement of spool 104, as will appear presently. In the neutral position the inner, adjacent sides of races 105 and 112 are flush with the sides 96A, 96B, respectively of the valve body 96 and do not extend into their respective bores 116, 118. The spool is urged to this neutral position by a plurality of spring and pin arrangements, shown in Figures 5 and 8, which are located in the circumferentially spaced aperture 125 in valve body 96. In the embodiment of the invention shown, five of these spring and pin devices are shown and as they are all identical only one will be described. Within aperture 125 are located pins 127, 128 which are urged outwardly of the valve body 96 by means of spring 129 which is located therebetween. Pins 127, 128 abut against their respective races 105, 112 and thereby urge the associated spool valve 104 towards its neutral position. The strength of these springs 129 determines the resistance to movement of the valve and by using stronger springs, shimming of the steering wheel can be dampened out. The desirable degree of "road feel" can thus be obtained.

When the operator of the tractor causes the steering shaft 58 to be turned in one direction or the other, by turning the steering wheel 120, the reaction of the worm 56 against pinion 54 causes the shaft 58 to first shift in an axial direction before any appreciable turning movement of the pinion 54 takes place. It is such axial shifting of the shaft 58 and its associated spool 104 which causes actuation of the hydraulic mechanism as follows.

Figure 5:
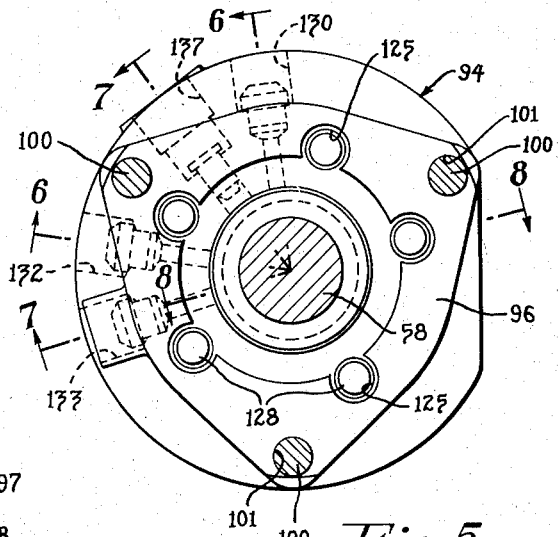
Figure 5 is an elevational, sectional view of the valve on a further enlarged scale, taken on line 5—5 of Figure 4.
Figure 6:
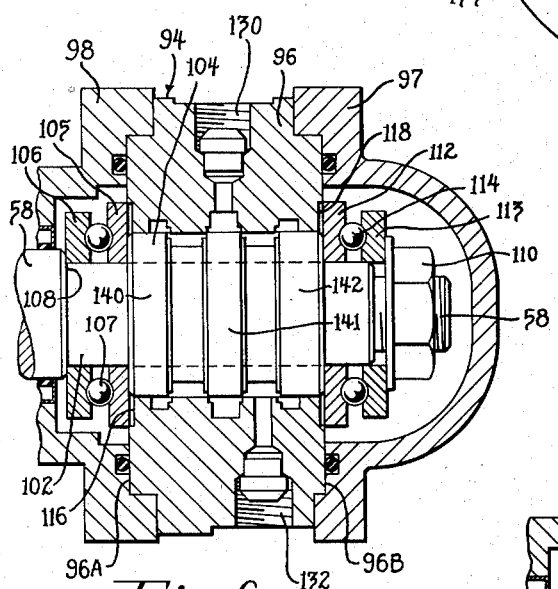
Figure 6 is a sectional view of the valve taken on line 6—6 of Figure 5.
Figure 7:
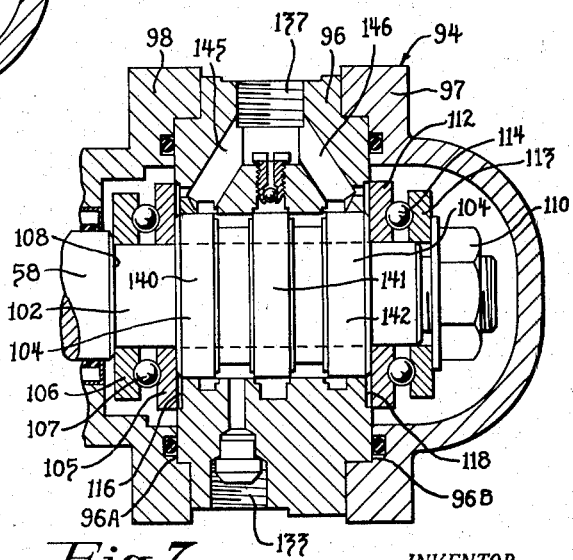
Figure 7 is a sectional view taken on line 7—7 of Figure 5.
Figure 8:
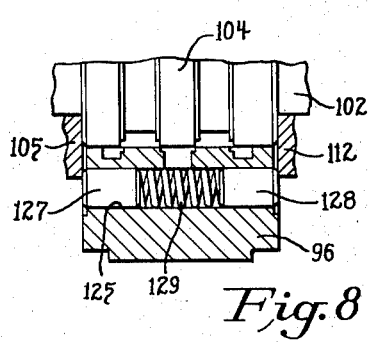
Figure 8 is a fragmentary sectional view of the valve showing one of the valve centering springs, taken on line 8—8 of Figure 5.

A conventional, constant running, hydraulic pump 131 located on the tractor supplies fluid through conduit 122 under pressure to the valve through inlet 130 (Figs. 5 and 6). Ports 132 and 133 in the valve body 96 each alternately serve as supply and return ports through their respective conduits 134 and 135 which lead to the cylinders 90, 91 shown in Figures 3 and 4. The return of fluid from the valve to the pump is through opening 137 (Fig. 7) and its connecting conduit 138 (Fig. 3).

*Operation*

When the operator turns the wheel 120 in one direction, the steering shaft 58 and its associated worm 56 tend to turn pinion 54. However, before any turning movement of pinion 34 and its steering post 38 occurs, the thrust of the worm 56 against pinion 54 moves shaft 58 and its spool valve 104 in an axial direction, say to the left as viewed in the drawings. This shifting causes race 112 to enter recess 118 until it contacts valve body 96. This axial movement is very small, on the order of a few thousandths of an inch, and this movement of spool 104 allows pressure fluid to flow between lands 141, 142 of spool 104 and out port 132 through conduit 134 and into chambers 90, 91. This shifting movement of the spool has placed chambers 90, 91 on the opposite sides of the movable vanes 66, 68 in fluid communication for fluid return to the pump through conduit 135, port 133, the space between lands 140, 141, passageway 145, outlet 137 and conduit 138. Thus shifting of the spool has caused fluid to be admitted to chambers 90, 91 to react on one side of vanes 66, 68 causing them to turn the steering post 38 which is connected thereto. Fluid on the functionally opposite sides of the vanes 66, 68 is returned to the pump as described. Turning the steering wheel 120 in the opposite direction causes axial shifting of the spool in the opposite direction, or to the right, which admits fluid under pressure through the space between lands 140, 141, port 133, conduit 135 and into chambers 90, 91 which causes the movable vanes 66, 68 and steering post 38 to rotate in the opposite direction. Fluid on the opposite sides of the vanes 66, 68 is returned to the pump through ports 86, 87, conduit 134, port 132, passageway 146, outlet 137 and conduit 138.

As previously mentioned, turning movement of the steering wheel 120 first causing the hydraulic mechanism to turn the spindle 38 and the amount of "road feel" or resistance to turning can be varied by varying the strength of springs 129. In the event of failure of the hydraulic system or when the tractor engine is shut off, steering is effected in the conventional manner through the worm and gear with no assistance from the hydraulic fluid.

In Figures 1, 12 and 13 are illustrated tricycle type front wheel suspension assembly which can be utilized with this steering mechanism. The lower portion of post 38 has tapped holes 150 into which can be threaded the cap bolts 151 which secure the various wheel brackets 152, 153 thereto.

A standard front wheel suspension assembly, shown in Figures 9, 10 and 11 can easily be interchanged with the tricycle type. In this assembly the plate 155 would be bolted to post 38.

Either conventional manual steering or power steering is readily available to the customer at an economical cost. This steering assembly is adaptable to existing tractor units. A minimum number of parts are required to effect the changeover from mechanical to power steering or vice-versa. The general appearance of this compact unit remains the same in either case. To change to a mechanical steering arrangement from the power arrangement previously described, it is necessary to simply replace vane body 24 with a "spacer" or dummy of the same height and diameter and the double vane assembly 62 would not be used. Pinion 54 and worm 56 could be of a different mechanical ratio and these changes can be easily made entirely with the assembly 18.

By means of this invention there has been provided a simple, compact and integral steering assembly which can be economically adapted to existing tractor models having definite space limitations. The entire unit is enclosed and protected. Either mechanical or power steering is available, the interchange of which can be effected without cost penalty to the consumer. The steering worm and pinion are within the same housing as the cylinder and vanes and located closely thereto. A double rotating vane, whih applies a purely torsional moment to the steering spindle, is located close to the ground wheels and power is applied directly to the steering spindle where it is most efficiently used.

What is desired to be secured by Letters Patent is:

1. A steering gear assembly for a tractor comprising, in combination, an apertured frame plate, a short spindle journaled in said aperture, an inverted cup-shaped housing spaced above said plate and receiving the upper end of said spindle, a thrust bearing disposed between said spindle upper end and the top of said housing so as to permit the spindle to bear the weight of said tractor, an annular member sandwiched in said space between said frame plate and said housing to define an annular hydraulic motor chamber, a pair of piston vanes secured to said spindle for rotation in said chamber, said vanes and said chamber defining a pair of double-acting hydraulic motors, a pinion secured to said spindle for rotation in said housing, a steering shaft coupled to said pinion for rotation of said spindle, and a valve responsive to rotation of said shaft and being in fluid communication with said hydraulic motors for causing fluid under pressure to be admitted to said motors so as to rotate the vanes, and thus rotate the spindle, in the same direction as said steering shaft turns said pinion.

2. A steering gear assembly for a tractor comprising, in combination, an apertured frame plate, a short spindle journaled in said aperture, an inverted cup-shaped housing spaced above said plate and receiving upper end of said spindle, a thrust bearing disposed between said spindle upper end and the top of said housing so as to permit the spindle to bear the weight of said tractor, an annular member sandwiched in said space between said frame plate and said housing to define an annular hydraulic motor chamber, a pair of piston vanes releasably secured to said spindle for rotation in said chamber, said vanes and said chamber defining a pair of double-acting hydraulic motors, releasable means for locking said plate, said member, and said housing in sandwiched relation so that the member and said vanes may be easily removed and a spacer substituted when hydraulic operation is not desired, a pinion secured to said spindle for rotation in said housing, a steering shaft coupled to said pinion for rotation of said spindle, and a valve responsive to rotation of said shaft and being in fluid communication with said hydraulic motors for causing fluid under pressure to be admitted to said motors so as to rotate the vanes, and thus rotate the spindle, in the same direction as said steering shaft turns said pinion.

References Cited in the file of this patent

UNITED STATES PATENTS

| | | |
|---|---|---|
| 2,213,271 | Davis | Sept. 3, 1940 |
| 2,521,652 | Rockwell | Sept. 5, 1950 |
| 2,762,446 | Worthington et al. | Sept. 11, 1956 |